United States Patent
Park

(10) Patent No.: US 7,706,651 B2
(45) Date of Patent: Apr. 27, 2010

(54) AIR BLOWN OPTICAL FIBER UNIT HAVING BEAD ATTACHED ON THE SURFACE

(75) Inventor: Chan-Yong Park, Seoul (KR)

(73) Assignee: LS Cable Ltd., Anyang (KR)

( * ) Notice: Subject to any disclaimer, the term of this patent is extended or adjusted under 35 U.S.C. 154(b) by 428 days.

(21) Appl. No.: 11/720,994

(22) PCT Filed: Jun. 30, 2005

(86) PCT No.: PCT/KR2005/002075

§ 371 (c)(1), (2), (4) Date: Jun. 6, 2007

(87) PCT Pub. No.: WO2006/062280

PCT Pub. Date: Jun. 15, 2006

(65) Prior Publication Data

US 2009/0202209 A1    Aug. 13, 2009

(30) Foreign Application Priority Data

Dec. 8, 2004    (KR) ............... 10-2004-0103192

(51) Int. Cl.
*G02B 6/02* (2006.01)
*G02B 6/44* (2006.01)

(52) U.S. Cl. .................. 385/128; 385/100; 385/123

(58) Field of Classification Search ............ None
See application file for complete search history.

(56) References Cited

U.S. PATENT DOCUMENTS

| | | | | | |
|---|---|---|---|---|---|
| 4,964,694 | A | * | 10/1990 | Oohashi et al. | 385/128 |
| 5,042,907 | A | * | 8/1991 | Bell et al. | 385/123 |
| 5,268,984 | A | * | 12/1993 | Hosoya et al. | 385/128 |
| 5,533,164 | A | * | 7/1996 | Preston et al. | 385/128 |
| 5,555,355 | A | * | 9/1996 | Narayanaswami | 345/621 |
| 5,557,703 | A | * | 9/1996 | Barker et al. | 385/128 |

FOREIGN PATENT DOCUMENTS

| | | | |
|---|---|---|---|
| EP | 0345968 A2 | 12/1989 | |
| EP | 0521710 A1 | 1/1993 | |
| EP | 1396745 A3 | 4/2004 | |
| WO | WO 2006/025645 | 3/2006 | |

OTHER PUBLICATIONS

International Search Report, dated Oct. 21, 2005, in International patent appln. No. PCT/KR2005/002075.

* cited by examiner

*Primary Examiner*—Tina M Wong
(74) *Attorney, Agent, or Firm*—Sherr & Vaughn, PLLC

(57) ABSTRACT

Disclosed is an air blown optical fiber unit having beads attached on its surface. The air blown optical fiber unit includes at least one optical fiber, a buffer layer surrounding the optical fiber and made of polymer resin, an outer layer surrounding the buffer layer and made of polymer resin, and beads attached on a surface of the outer layer to have height of 40 μm to 120 μm on the average. This air blown optical fiber unit gives improved installation characteristics.

5 Claims, 2 Drawing Sheets

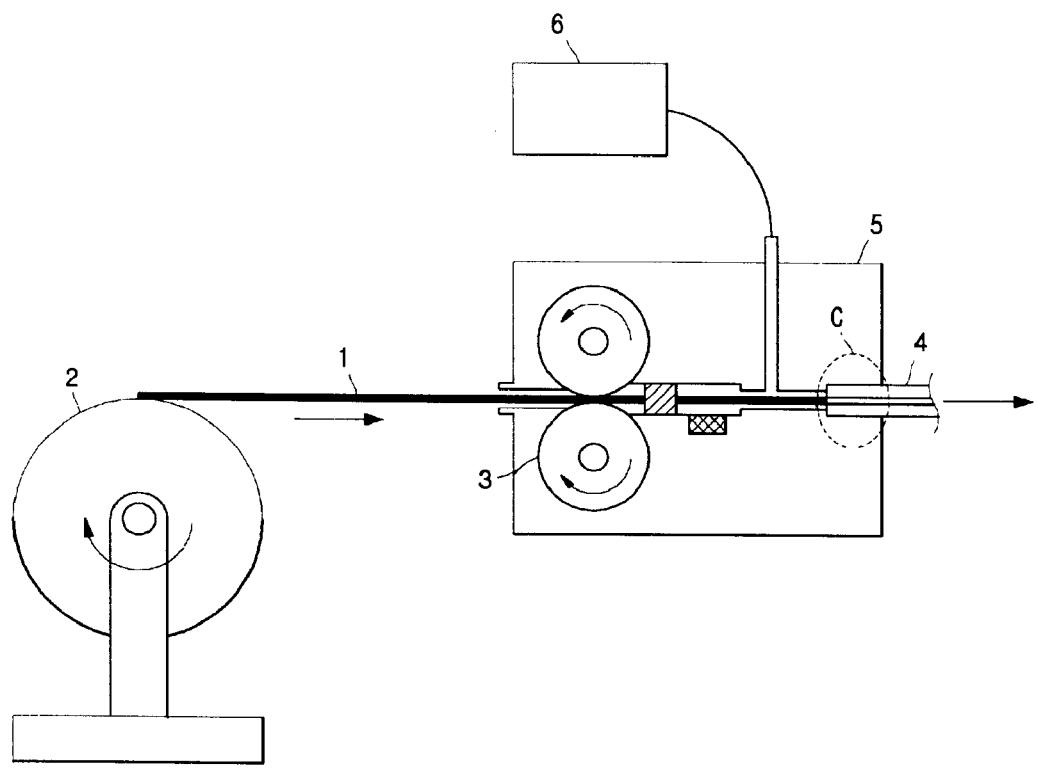
[Fig. 1]
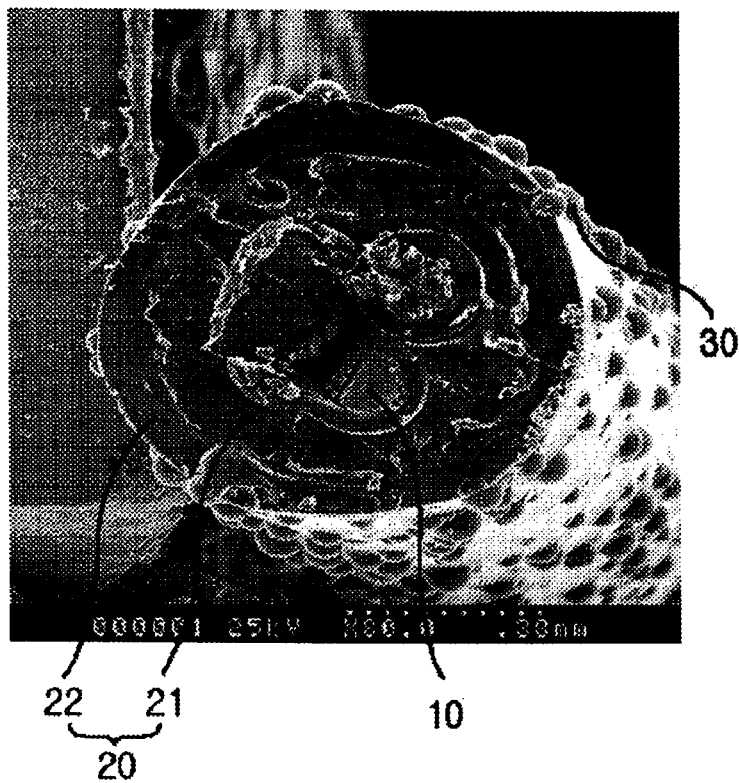
[Fig. 2]

[Fig. 3]
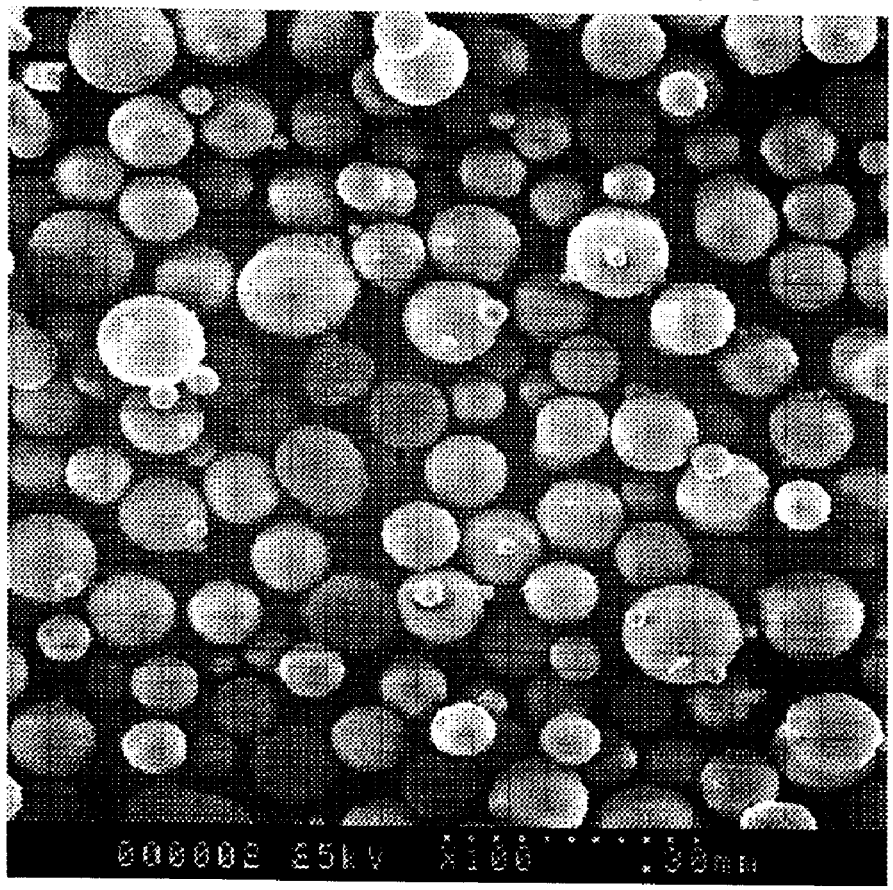
[Fig. 4]
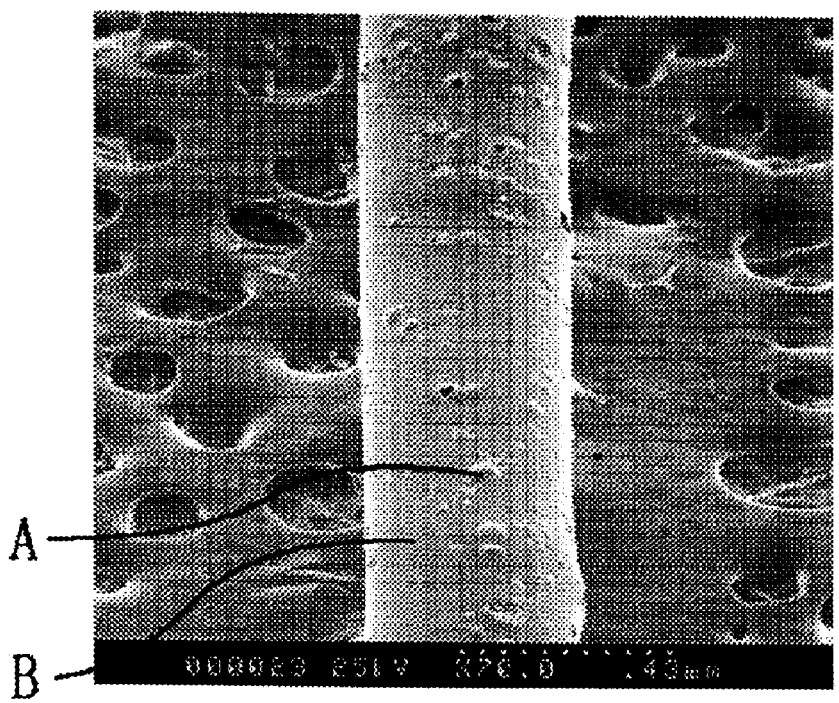

AIR BLOWN OPTICAL FIBER UNIT HAVING BEAD ATTACHED ON THE SURFACE

TECHNICAL FIELD

The present invention relates to an air blown optical fiber unit, and more particularly to an air blown optical fiber unit having a surface structure capable of maximizing fluid drag force during air blown installation.

BACKGROUND ART

For installation of optical fibers, a method of binding or twisting several optical fibers into a cable, and then installing this cable has been mainly used. In this cable installation method, optical fibers much more than required at the point of installation are generally installed in advance with expectation of future demands.

However, since more various kinds of optical fibers are required according to the trend of new communication environments and there have been developed high performance communication systems suitably coping with communication capacity even in restricted optical fiber installation environments, it cannot be considered desirable that a large amount of optical fibers are installed in advance just with expectation of future demands. In particular, in aspect of a user terminal, namely an access network or a premise wiring, a mode of an optical fiber or cable in future cannot be decided at the present point of time. Thus, if a large amount of optical fibers are installed in advance with incurring much expense, there may be a waste of money if a mode of an optical fiber or cable is changed in future.

In order to solve the above problems, a method for installing an optical fiber unit having several optical fiber strands collected therein by air pressure is widely used. This air blown installation method was firstly proposed by British Telecom Co. (see U.S. Pat. No. 4,691,896) in 1980. In this air blown installation method, a polymer installation tube, called a micro tube or duct, having specific constitution and sectional shape is installed at an optical fiber installation spot in advance, and then an air blown optical fiber unit (hereinafter, referred to just as 'an optical fiber unit') is inserted into the micro tube or duct as much as required by air pressure. If optical fibers are installed using the above optical fiber installation method, many advantages are ensured, namely easy installation and removal of optical fibers, reduced costs for initial installation, and easy improvement of performance in future.

FIG. 1 is a schematic view showing an optical fiber unit installation device used in the above air blown installation method. Referring to FIG. 1, the installation device successively inserts an optical fiber unit 1 from an optical fiber unit supplier 2 into an installation tube 4 connected to an outlet C of a blowing head 5 by using a driving roller 3 and a pressing means 6, and at the same time blows compressed air toward the outlet C of the blowing head 5 by using the pressing means 6. Then, the compressed air flows at a fast rate toward the outlet C, and accordingly the optical fiber unit 1 introduced into the blowing head 5 is installed in the installation tube 4 by means of a fluid drag force of the compressed air.

In order to ensure desirable installation of the optical fiber unit 1 in the air blown installation method, the fluid drag force of the compressed air should be great.

The fluid drag force F may be expressed as follows.

$$\vec{F}_{drag} = PR_1 R_2 \frac{dP}{dL} \qquad \text{Equation 1}$$

(P: compressed air pressure, $R_1$: inner diameter of the installation tube, $R_2$: outer diameter of the optical fiber unit, L: length of the installation tube)

In the Equation 1, the inner diameter $R_1$ of the installation tube and the outer diameter $R_2$ of the optical fiber unit are already defined in standards. Thus, in order to maximize the fluid drag force F, it is preferred to form irregularity on the surface of the optical fiber unit for increasing a contact area between the compressed air and the optical fiber unit.

As a scheme for increasing a contact area between the compressed air and the optical fiber unit, various structures of optical fiber units having irregularity on their surfaces are disclosed in U.S. Pat. No. 5,042,907, U.S. Pat. No. 5,555,335, U.S. Pat. No. 5,441,813, U.S. Pat. No. 6,341,188 and so on.

Specifically, U.S. Pat. No. 5,042,907 and U.S. Pat. No. 5,555,335 disclose an optical fiber unit having glass beads attached on its outer surface. In addition, differently from the method using beads, U.S. Pat. No. 5,441,813 and U.S. Pat. No. 6,341,188 disclose an optical fiber unit having concave dimples formed on its surface by using foaming polymer materials and an optical fiber unit having irregularity on its surface by winding a fiber made of special materials.

However, the above conventional techniques do not have any disclosure in relation to height of the irregularity, thickness of the outer layer on which the irregularity is formed, and Young's modulus of the outer layer of the optical fiber unit, which give serious influences on the air blown installation characteristics. Thus, there still exist difficulties in fabricating an optical fiber unit with excellent installation characteristics in the prior art.

DISCLOSURE OF INVENTION

Technical Problem

The present invention is designed in consideration of the above problems, and therefore it is an object of the invention to provide an optical fiber unit capable of improving air blown installation characteristics by optimizing height of irregularity formed on the optical fiber unit, and thickness and Young's modulus of an outer layer of the optical fiber unit on which the irregularity is formed.

Technical Solution

In order to accomplish the above object, the present invention provides an air blown optical fiber unit, which includes at least one optical fiber; a buffer layer surrounding the optical fiber and made of polymer resin; an outer layer surrounding the buffer layer and made of polymer resin; and beads attached on a surface of the outer layer to have height of 40 μm to 120 μm on the average.

Here, it is preferable that the beads are solid beads and the beads have an average diameter of 90 μm to 120 μm.

In addition, it is also preferable that the beads have substantially spherical shape.

Meanwhile, the outer layer preferably has a thickness of 50 μm to 80 μm and a Young's modulus of 30 kgf/mm² to 100 kgf/mm².

BRIEF DESCRIPTION OF THE DRAWINGS

These and other features, aspects, and advantages of preferred embodiments of the present invention will be more fully described in the following detailed description, taken accompanying drawings. In the drawings:

FIG. 1 shows an optical fiber unit installation device used for air blown installation;

FIG. 2 is a photograph of an air blown optical fiber unit according to an embodiment of the present invention;

FIG. 3 is a photograph of solid beads according to an embodiment of the present invention; and FIG. 4 is a photograph showing a conventional air blown optical fiber unit.

BEST MODE FOR CARRYING OUT THE INVENTION

The present invention will be described in detail referring to the drawings, the terms used should not be construed as limited to general and dictionary meanings but based on the meanings and concepts of the invention on the basis of the principle that the inventor is allowed to define terms appropriate for the best explanation. Therefore, the description herein the scope of the invention be understood that other and modifications could be made thereto without departing from the spirit and scope of the invention.

FIG. 2 is a perspective view showing an air blown optical fiber unit according to an embodiment of the present invention. Referring to FIG. 2, the optical fiber unit according to the present invention includes at least one optical fiber 10, and a protective layer 20 formed on an outside of the optical fiber 10.

The optical fiber 10 is a single-mode or multi-mode optical fiber having a core layer and a clad layer, made of quartz materials. The optical fiber 10 may have a single core or multiple cores as shown in FIG. 2.

The protective layer 20 is a coating layer surrounding the optical fiber 10 to protect the optical fiber 10 and ensure stiffness. The protective layer 20 may be composed of one kind of coating layer 10 various kinds of coating layers laminated. Preferably, the protective layer 20 has a dual structure composed of a buffer layer 21 and an outer layer 22. However, the protective layer 20 may have only the buffer layer 21 or additionally have an intermediate layer between the buffer layer 21 and the outer layer 22 in various ways, not limited to the above case.

The buffer layer 21 is a coating layer directly surrounding the optical fiber 10. The buffer layer 21 is made of radiation curable polymer resin, and preferably made of radiation curable acrylate. The outer layer 22 is a coating layer to which beads 30 are attached for enhancing fluid drag force, and the outer layer 22 plays roles of protecting the optical fiber against external impacts and keeping stiffness so that the optical fiber unit may advance straightly during air blown installation. For this purpose, it is preferred to suitably select material and thickness of the outer layer 22.

The outer layer 22 is mainly made of radiation curable acrylate, which is a radiation curable polymer resin that is cured by radiation, but not limitedly. The outer layer 22 preferably employs radiation curable acrylate having higher Young's modulus than the buffer layer 21 for keeping stiffness. However, if the Young's modulus of the outer layer 22 is too high, cracks may be easily generated by bending. Thus, radiation curable acrylate having Young's modulus of 30 kgf/mm$^2$ to 100 kgf/mm$^2$ is preferably used for the outer layer 22. Though radiation curable acrylate having a high Young's modulus is used for the outer layer 22, stiffness is lowered if its thickness is small, while, if the thickness is increased too much, the outer layer 22 may be shrunk when temperature is abruptly changed, resulting in increase of optical loss. Thus, the thickness of the outer layer 22 is preferably regulated in the range of 20 μm to 100 μm, and more preferably in the range of 50 μm to 80 μm.

Meanwhile, the beads 30 are attached on the surface of the outer layer 22. The beads 30 attached to the outer layer 22 of the optical fiber unit form irregularity on the surface of the optical fiber unit to increase a fluid drag force of the compressed air during air blown installation. Preferably, the beads 30 are mainly made of glass. However, the present invention is not limited to the above case. The beads 30 may have any shape if they may be protruded from the surface of the outer layer 22 to form irregularity, but they preferably have a spherical shape to reduce friction with the inner surface of the installation tube during air blown installation. In addition, as for the beads 30, solid beads are preferred to hollow beads. If solid beads are used, it may be prevented that the beads 30 are broken during handling or installation of the optical fiber unit to deteriorate the irregularity structure formed on the surface of the optical fiber unit.

Meanwhile, as the beads 30 are protruded higher from the surface of the outer layer, a contact area between the compressed air and the optical fiber unit is increased, and accordingly the fluid drag force of the compressed air is improved to ensure easier installation of the optical fiber unit. However, if the beads 30 have great diameter to increase height of the beads 30, it is difficult to control the process of attaching the beads 30 on the surface of the outer layer 22, and also the optical fiber unit has increased weight, resulting in deteriorated installation characteristics. Thus, it is preferred that the beads 30 have an average diameter of 90 μm to 120 μm so that the beads 30 are exposed out by 40 μm to 120 μm on the average.

In addition, since the beads 30 are minute, it is impossible to make all beads have the same size. However, in order to control a degree of attachment of the beads 30 during the process, it is preferred that the beads 30 have sizes distributed uniformly. Thus, size distribution of the beads 30 is preferably uniformly controlled using a particle classifier or the like. In addition, when the beads 30 selected using a particle classifier or the like are attached to the outer layer 22, a particle blowing manner for blowing the beads 30 toward the outer layer 22 by using fluidization before the outer layer 22 is cured after being formed is more preferably used rather than a particle stirring manner in which the beads 30 are mixed in a coating agent (e.g., resin) for forming the outer layer 22 and then coated. If the particle blowing manner is used, height of the beads 30 may be more precisely controlled than the case using the particle stirring manner, since a curing rate of the outer layer 22 and a dispersing rate of the beads 30 may be suitably controlled at the instant that the beads 30 are attached.

Hereinafter, air blown installation characteristics of the optical fiber unit in which height of the beads, thickness of the outer layer, and Young's modulus of the outer layer are controlled according to a preferred embodiment of the present invention is compared with installation characteristics of a conventional optical fiber unit.

MODE FOR THE INVENTION

Embodiment

A buffer layer was coated on the outer circumference of aggregated 4-core single-mode optical fibers by using acrylate that is a radiation curable polymer resin so that the buffer layer had a diameter of about 920 μm. After that, an outer layer was formed on the buffer layer. The outer layer was coated to have a thickness of about 50 μm by using acrylate having Young's modulus of 59 kgf/mm$^2$. In addition, before the outer layer was cured, solid glass beads having an average diameter of 110 μm were attached on the surface of the outer layer by means of the particle blowing manner. FIG. 2 shows the optical fiber unit fabricated according to the present invention, and FIG. 3 is a photograph of the solid beads used in the present invention. Referring to FIG. 2, it would be found that the irregularity structure capable of inducing fluid drag force in a good way is formed since the beads 30 are protruded satisfactorily and the beads 30 are uniformly protruded from the outer layer 21. The beads are buried in the outer layer by about 40 μm on the average and protruded out by about 70 μm. As a result of conducting the air blown installation using the optical fiber unit prepared according to the present invention, the optical fiber unit was satisfactorily installed to meet 20 mpm to 25 mpm per minute, regulated in the BT (British Telecom) standards, and also showed an excellent peeling property. Meanwhile, as a result of changing the thickness of the outer layer in the range of 50 μm to 80 μm with keeping the Young's modulus of the outer layer and protrusion degrees of the beads as they were, it was found that the satisfactory installation characteristics were maintained substantially identically.

Comparative Example

A buffer layer was coated on the outer circumference of aggregated 4-core single-mode optical fibers by using acrylate that is a radiation curable polymer resin so that the buffer layer had a diameter of about 760 μm. After that, an outer layer in which beads had been stirred in advance was formed on the buffer layer. At this time, the outer layer was coated to have a thickness of about 130 μm by using acrylate having Young's modulus of 10 kgf/mm$^2$. In addition, as for the beads, hollow glass beads having an average diameter of 50 μm were used. FIG. 4 is an enlarged photograph of an optical fiber unit fabricated according to the prior art. Referring to FIG. 4, it would be found that most of the beads were buried in the outer layer B and only beads A having relatively greater diameter were protruded out. Therefore, desirable irregularity could not be obtained on the surface of the optical fiber unit as a whole. As a result of conducting the air blown installation using the optical fiber unit prepared according to the prior art, desirable installation characteristics according to the BT standards could not be obtained since the surface of the optical fiber unit did not give sufficient fluid drag force. In particular, the optical fiber unit was fragile to external impacts due to low Young's modulus of the outer layer B, and its peeling property was not good since the outer layer B had a great thickness.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, it is possible to provide an optical fiber unit having excellent air blown installation characteristics by optimizing thickness and Young's modulus of the outer layer of the optical fiber unit, and size distribution, sizes and protruded heights of the beads.

The invention claimed is:

1. An air blown optical fiber unit, comprising:
    at least one optical fiber;
    a buffer layer surrounding the optical fiber and made of polymer resin;
    an outer layer surrounding the buffer layer and made of polymer resin; and
    beads having an average diameter of 90 μm to 120 μm and attached on a surface of the outer layer to have a height from the surface of the outer layer of 40 μm to 120 μm on the average.

2. The air blown optical fiber unit according to claim 1, wherein the beads are solid beads.

3. The air blown optical fiber unit according to claim 1, wherein the beads have substantially spherical shape.

4. The air blown optical fiber unit according to claim 1, wherein the outer layer has a thickness of 50 μm to 80 μm.

5. The air blown optical fiber unit according to claim 1, wherein the outer layer has a Young's modulus of 30 kgf/mm$^2$ to 100 kgf/mm$^2$.

* * * * *